United States Patent
Quan

(10) Patent No.: US 7,180,403 B2
(45) Date of Patent: Feb. 20, 2007

(54) RFID READER UTILIZING AN ANALOG TO DIGITAL CONVERTER FOR DATA ACQUISITION AND POWER MONITORING FUNCTIONS

(75) Inventor: Ralph W. Quan, Broomfield, CO (US)

(73) Assignee: Assa Abloy Identification Technology Group AB, Stockholm (SE)

(*) Notice: Subject to any disclaimer, the term of this patent is extended or adjusted under 35 U.S.C. 154(b) by 340 days.

(21) Appl. No.: 10/848,246

(22) Filed: May 18, 2004

(65) Prior Publication Data

US 2005/0258940 A1 Nov. 24, 2005

(51) Int. Cl.
*H04Q 5/22* (2006.01)
*G08B 13/14* (2006.01)
*G06F 13/42* (2006.01)

(52) U.S. Cl. .................. 340/10.3; 340/572.4; 340/825; 340/572; 340/447; 340/10.34; 340/10.4

(58) Field of Classification Search ............... 340/10.3, 340/572.4, 825, 572, 447, 10.34, 10.4
See application file for complete search history.

(56) References Cited

U.S. PATENT DOCUMENTS

| | | | | |
|---|---|---|---|---|
| 4,730,188 A | | 3/1988 | Milheiser | 340/825 |
| 5,347,263 A | | 9/1994 | Carroll et al. | 340/572 |
| 5,541,574 A | | 7/1996 | Lowe et al. | 340/447 |
| 6,354,468 B1 | * | 3/2002 | Riek | 222/129.3 |
| 6,367,697 B1 | * | 4/2002 | Turner et al. | 235/440 |
| 6,476,708 B1 | | 11/2002 | Johnson | 340/10.34 |
| 6,650,227 B1 | * | 11/2003 | Bradin | 340/10.3 |
| 6,731,199 B1 | * | 5/2004 | Ueda | 340/10.4 |
| 2003/0090367 A1 | | 5/2003 | Carroll et al. | 340/10.4 |
| 2003/0137404 A1 | | 7/2003 | Bonneau, Jr. et al. | |
| 2004/0195324 A1 | | 10/2004 | Uchiyama et al. | |
| 2004/0256460 A1 | | 12/2004 | Charrat | |

FOREIGN PATENT DOCUMENTS

| | | |
|---|---|---|
| GB | 2 278 631 | 12/1994 |
| GB | 2305074 A | 3/1997 |

* cited by examiner

*Primary Examiner*—Jeffery Hofsass
*Assistant Examiner*—Scott Au
(74) *Attorney, Agent, or Firm*—Rodney F. Brown

(57) ABSTRACT

A reader for an RFID system includes an internal power source, a signal generator for generating a detection signal containing analog data and an excitation signal, a transmitting antenna for transmitting the detection and excitation signals, and a receiving antenna for receiving a transponder data signal from a transponder containing digital data. Receiver electronics are coupled with the receiving antenna for conditioning the transponder data signal before reading the digital data. The reader further includes a single-chip microcontroller coupled with the internal power source and the receiver electronics. The single-chip microcontroller has an analog to digital converter to measure the declining power level of the internal power source and to acquire the analog data from the detection signal and the digital data from the transponder data signal. The single-chip microcontroller also includes a firmware and/or software-based demodulator for demodulating the transponder data signal to read the digital data.

43 Claims, 3 Drawing Sheets

RFID READER UTILIZING AN ANALOG TO DIGITAL CONVERTER FOR DATA ACQUISITION AND POWER MONITORING FUNCTIONS

TECHNICAL FIELD

The present invention relates generally to RFID systems, and more particularly to the construction and operation of a reader in an RFID system.

BACKGROUND OF THE INVENTION

Radio frequency identification (RFID) systems generally consist of at least one host reader and a plurality of transponders, which are commonly termed credentials. The transponder is an active or passive radio frequency communication device, which is directly attached to or embedded in an article to be identified or otherwise characterized by the reader, or which is alternatively embedded in a portable substrate, such as a card, keyfob, tag, or the like, carried by a person or an article to be identified or otherwise characterized by the reader.

A passive transponder is dependent on the host reader as its power supply. The host reader "excites" or powers up the passive transponder by transmitting high voltage excitation signals into the space surrounding the reader, which are received by the transponder when it is near, but not necessarily in contact with, the reader. The excitation signals from the reader provide the operating power for the circuitry of the recipient transponder. In contrast, an active transponder is not dependent on the reader as its power supply, but is instead powered up by its own internal power source, such as a battery. Once the transponder is powered up, the transponder communicates information, such as identity data or other characterizing data stored in the memory of the transponder, to the reader and the reader can likewise communicate information back to the transponder without the reader and transponder coming in contact with one another.

The powered up transponder communicates with the reader by generating transponder data signals within the circuitry of the transponder and transmitting the transponder data signals in the form of electromagnetic waves into the surrounding space occupied by the reader. The reader contains its own circuitry to "read" the data contained in the transponder data signals received from the transponder. Exemplary RFID systems communicating in this manner are disclosed in U.S. patents U.S. Pat. No. 4,730,188 to Milheiser (the '188 patent), U.S. Pat. No. 5,541,574 to Lowe et al. (the '574 patent), and U.S. Pat. No. 5,347,263 to Carroll et al. (the '263 patent), all of which are incorporated herein by reference.

RFID systems are generally characterized by a number of parameters relating to transmission and processing of the data signals. Such parameters include the carrier frequency of the data signals, the transfer rate of the data in the data signals, and the type of modulation of the data signals. In particular, data signals communicated between the transponder and reader of a given RFID system are usually at a specified standard carrier frequency, which is characteristic of the given RFID system. For example, RFID systems, which employ transponders of the type conventionally termed proximity cards or proximity tags, typically communicate by means of data signals at a carrier frequency within a range of 100 to 150 kHz. This carrier frequency range is nominally referred to herein as 125 kHz carrier frequency and is deemed a low frequency. In contrast, RFID systems, which employ transponders of the type conventionally termed smart cards, typically communicate by means of data signals at a higher frequency of 13.56 MHz.

The transfer rate of digital data communicated between the transponder and reader of a given RFID system via the data signals is commonly at one of a number of specified standard data rates, which is also characteristic of the given RFID system. The specified data rates are usually a function of the carrier frequency for the given RFID system. For example, RFID systems operating at the 125 kHz carrier frequency typically employ a relatively low data rate on the order of a few kilobits per second. For RFID systems operating at the 13.56 MHz carrier frequency, one particular industry standard specifies a low data rate of about 6 kilobits per second and a high data rate of about 26 kilobits per second. Another industry standard specifies an even higher data rate of 106 kilobits per second for RFID systems operating at the 13.56 MHz carrier frequency.

Finally, the type of modulation applied to data signals in a given RFID system is also characteristic of the given RFID system. Among the different modulation types available to RFID systems are frequency shift keying (FSK), phase shift keying (PSK) and amplitude shift keying (ASK).

As a rule, the circuitry of the reader is more extensive and complex than the circuitry of the transponder because the reader requires a higher degree of functionality relative to the transponder, particularly in the case of a passive transponder. Whereas most of the functionality of the transponder can normally be contained within a single integrated circuit, the diverse functionality of the reader typically requires a plurality of separate and discrete non-integrated (i.e., external) electronic components. For example, FIGS. 1–3 and 6 and the associated text of the '188 patent disclose separate specific hardware for generating an excitation signal transmitted into the surrounding space from a reader antenna which enables powering up of nearby passive transponders. The '188 patent also discloses separate specific hardware for detecting transponder data signals from among the signals received from the surrounding space on the reader antenna, for conditioning the transponder data signals received from the surrounding space when detected, and for demodulating the resulting conditioned transponder data signals, respectively, to read the data contained in the transponder signal.

The '263 patent refines the reader circuitry of the '188 patent by integrating certain electronic components of the reader circuitry of the '188 patent, such as decoders and drivers, into a single-chip microcontroller. In accordance with the '263 patent, operation of the reader comprises receiving a transponder data signal on the reader antenna and feeding the transponder data signal to a multi-stage band pass amplifier downstream of the reader antenna and upstream of the microcontroller. The multiple stages of the band pass amplifier condition, i.e., filter and amplify, the transponder data signal. The resulting conditioned transponder data signal is passed to the microcontroller where the data contained in the transponder data signal is read.

Although the design of the reader disclosed in the '263 patent realizes some economies of size and cost over the prior art by integrating a plurality of electronic components and their functionalities into the microcontroller of the reader, the use of an external multi-stage band pass amplifier limits the practicality of the reader for universal applications. In order to universally adapt the reader of the '263 patent to the multiplicity of different available carrier frequencies, data rates, and modulation types recited above, the reader would require a separate external multi-stage receiver for each variation of carrier frequency, data rate, and modulation type, respectively. It is readily apparent that a universal reader based on the reader design of the '263 patent would require many additional external receiver components, thereby offsetting any advantage gained by integrating other reader components and functionalities into the reader microcontroller.

The present invention disclosed hereafter recognizes the particular desirability of eliminating the external multi-stage band pass amplifier in the circuitry of the reader or at least reducing the number of stages of the band pass amplifier so that the reader more efficiently accommodates a range of carrier frequencies, data rates, and modulation types for signals received by the reader. The present invention also recognizes the desirability of integrating the functionalities of other electrical components into the microcontroller of the reader in addition to or in the alternative to those disclosed in the '263 patent. For example, the present invention recognizes the specific desirability of integrating power conservation functionalities into the microcontroller of the reader.

U.S. Pat. No. 6,476,708 to Johnson (the '708 patent) discloses a reader having relatively low power consumption requirements. Low power consumption is a particularly advantageous characteristic for a reader, which is powered by a self-contained portable power source within the reader, such as a small disposable or rechargeable battery. Use of the self-contained power source enables a user to position the reader in a remote location which lacks access to an ac power line or an ac power outlet. A battery, however, has a finite life necessitating replacement of the battery in the reader at the end of its useful life, which is both costly and time consuming. Accordingly, it is desirable to reduce the power demands on the battery during operation, thereby extending the useful life of the battery.

The reader of the '708 patent includes an excitation signal generator circuit, transponder detection circuit coupled to the excitation signal generator circuit, and a power source in the form of a small portable battery. The excitation signal generator circuit unit initially operates in a reduced power state effected by drawing reduced electrical current from the power source. The excitation signal generator circuit generates ring signals containing analog data in response to the reduced electrical current. The ring signals are transmitted from a reader antenna and the ring signals propagate into the space surrounding the reader, but are insufficient to power operation of any transponders residing in the surrounding space.

The transponder detection circuit consists of hardware which monitors the level of a transponder detection parameter embodied in the analog data of the ring signals. When the transponder detection circuit determines that the transponder detection parameter has passed a threshold level due to the presence of a transponder in the surrounding space, the transponder detection circuit switches the excitation signal generator circuit from the reduced power state to an increased power state and generation of the ring signals is terminated. The excitation signal generator circuit draws increased electrical current from the power source in the increased power state to generate an excitation signal which is sufficient to power the transponder. The excitation signal is transmitted by the reader and received by the transponder to power the transponder circuitry. The transponder circuitry in turn generates a transponder data signal containing digital data, which is transmitted to the reader. The reader reads the digital data contained in the transponder data signal and the excitation signal generator circuit switches back to the reduced power state, resuming generation of the ring signals while terminating generation of the excitation signal. It is apparent that the duty cycle of the excitation signal generator circuit is significantly lower when operating in the reduced power state than when operating in the increased power state. As a result, the life of the power source is greatly extended and more electrical power is available to the other operations of the reader.

As such, the present invention recognizes a need for a reader which integrates many reader functionalities, including reader power conservation and other analog and digital data acquisition and processing, into a reader microcontroller to realize economies of size and/or cost while maintaining or enhancing reader performance. Accordingly, it is generally an object of the present invention to integrate a plurality of reader functionalities into a reader microcontroller. It is generally another object of the present invention to realize economies of size and/or cost over prior art reader designs while maintaining or enhancing reader performance. More particularly, it is an object of the present invention to integrate certain power conservation functionalities of the reader into a reader microcontroller. It is a further object of the present invention to integrate other analog and digital data acquisition and processing functionalities of the reader into a reader microcontroller. It is another object of the present invention to eliminate the external multi-stage band pass amplifier altogether or to at least reduce the number of stages of the external multi-stage band pass amplifier in the circuitry of the reader. It is yet another object of the present invention to substitute lower cost and simpler electronics for the external multi-stage band pass amplifier in the circuitry of the reader, which produce suitable input signals for processing by an integrated microcontroller of the reader. It is a still further object of the present invention to readily accommodate a range of carrier frequencies, data rates, and modulation types for signals received by the reader. These objects and others are accomplished in accordance with the invention described hereafter.

SUMMARY OF THE INVENTION

The present invention is a reader for an RFID system. The reader includes a signal generator for generating a detection signal containing analog data, preferably when operating in a reduced power state, and for generating an excitation signal, preferably when operating in an increased power state. A transmitting antenna is coupled with the signal generator for transmitting the detection signal and the excitation signal into a space surrounding the transmitting antenna. A receiving antenna is provided for receiving a transponder data signal from a transponder in the space, wherein the transponder data signal is at a voltage value and contains digital data. The receiving antenna and the transmitting antenna can both be included in a single dual-function antenna if desired.

The reader preferably further includes a transmitting tuning capacitor paired with the transmitting antenna and a receiving tuning capacitor paired with the receiving antenna to tune the respective paired antenna to a predetermined carrier frequency. When the receiving antenna and transmitting antenna are both included in a single dual-function antenna, the receiving tuning capacitor and transmitting tuning capacitor are likewise both preferably included in a single dual-function tuning capacitor paired with the single dual-function antenna.

In accordance with one embodiment, two or more receiving and transmitting antenna pairs or dual-function antennas are provided in the reader. Each antenna pair or dual-function antenna has a corresponding receiving and transmitting tuning capacitor pair or dual-function tuning capacitor, respectively, which tunes the associated antenna pair or dual-function antenna to a carrier frequency different than the carrier frequencies to which the remaining antenna pairs or dual-function antennas are tuned.

Receiver electronics are coupled with the receiving antenna for conditioning the transponder data signal to place the transponder data signal in a condition for reading the digital data. An internal power source, which has a declining power level as a function of use, is provided for supplying electrical operating power to the reader. The reader further includes a single-chip microcontroller coupled with the internal power source and the receiver electronics. The single-chip microcontroller includes an analog to digital converter to measure the declining power level of the internal power source, to acquire the analog data from the detection signal and the digital data from the transponder data signal and to convert the analog data from the detection signal to converted digital data. The single-chip microcontroller preferably further includes a demodulator, which is more preferably software and/or firmware based, for demodulating the transponder data signal to read the digital data from the transponder data signal.

The reader preferably further includes a sample and hold circuit having one or more sample times for isolating points on the detection signal where the analog data is to be acquired and for isolating points on the transponder data signal where the digital data is to be acquired. In accordance with one embodiment, the sample and hold circuit is included in the analog to digital converter of the single-chip microcontroller. The microcontroller controls the one or more sample times of the sample and hold circuit and adjusts the one or more sample times in response to different values of carrier frequency, data rate, and/or modulation type of the transponder data signal. The microcontroller also adjusts the one or more sample times to enable transponder detection from a limited sampling of detection signals.

The receiver electronics preferably includes a receiver electronics input from the receiving antenna, a receiver electronics output to the single-chip microcontroller, and a plurality of relatively low-cost simple electrical components selected from the group consisting of resistors, diodes, capacitors, and electrical switches, and preferably excludes relatively high-cost complex multi-stage band pass amplifiers. In accordance with a first embodiment, the receiver electronics includes a resistor divider section comprising first and second series resistors at the receiver electronics input forming a voltage divider to reduce the voltage value of the transponder data signal. The resistor divider section also comprises third and fourth series resistors downstream of the first and second series resistors positioned between ground and the power supply and a blocking capacitor positioned in parallel with the second series resistor upstream of the third and fourth series resistors to maintain the transponder data signal at the receiver electronics output in a voltage range between about ground and the power supply, inclusive.

In accordance with a second embodiment, the receiver electronics includes a peak detector section comprising a rectifier at the receiver electronics input to rectify the voltage value of the transponder data signal. The peak detector section further comprises a pair of series resistors downstream of the rectifier, which are positioned between ground and the power supply, and a blocking capacitor, which is positioned between the rectifier and the pair of series resistors, to maintain the transponder data signal at the receiver electronics output in a voltage range between about ground and the power supply, inclusive. The rectifier preferably includes a diode. The peak detector section preferably further comprises a detector capacitor and a detector resistor, wherein the detector capacitor and detector resister are positioned in parallel with one another and in parallel with the blocking capacitor downstream of the diode and upstream of the pair of series resistors.

In accordance with a third embodiment, the receiver electronics includes an integrator section comprising a rectifier and an integrator in series at the receiver electronics input and coupled with the receiver electronics output. The receiver electronics output is coupled with the analog to digital converter. The rectifier preferably includes a diode. The integrator preferably includes an integrator resistor and integrator capacitor in series with the diode. The integrator section preferably further comprises a paired grounding switch resistor and a grounding switch in series with one another and in parallel with the integrator capacitor downstream of the integrator resistor. The paired grounding switch resistor and grounding switch couple the integrator capacitor with ground when the grounding switch is closed and couple the integrator capacitor with the analog to digital converter when the grounding switch is open. The integrator section preferably still further comprises a charging switch in series with the integrator capacitor and ground. The charging switch couples the integrator capacitor with the receiving antenna when the charging switch is closed and decouples the integrator capacitor from the receiving antenna when the charging switch is open.

All three of the above-recited embodiments can be utilized together in combination as the reader receiver electronics. Alternatively, any two selected embodiments can be utilized in combination as the reader receiver electronics while excluding the remaining embodiment from the receiver electronics. In yet another alternative, only one selected embodiment can be utilized as the reader receiver electronics while excluding the remaining two embodiments from the receiver electronics.

The present invention is also a method for operating a reader for an RFID system. The method is initiated by generating a detection signal containing analog data during a detection mode of operation which preferably has a reduced power state. The detection signal is transmitted from a transmitting antenna into a space surrounding the transmitting antenna to detect a proximal transponder. The detection mode is preferably terminated when the proximal transponder is detected and an excitation mode of operation is initiated which preferably has an increased power state. An excitation signal is generated in the excitation mode and transmitted from the transmitting antenna into the surrounding space to power up the proximal transponder. A transponder data signal is generated by the proximal transponder in response to the excitation signal and propagated through the space from the proximal transponder. The transponder data signal is received at the reader with a receiving antenna. The transponder data signal is at a voltage value and contains digital data.

The transponder data signal is conditioned with receiver electronics coupled with the receiving antenna to place the transponder data signal in a condition for reading the digital data. The receiving antenna and transmitting antenna can both be included in a single dual-function antenna.

An analog to digital converter in a single-chip microcontroller is coupled with the receiver electronics and with an internal power source supplying electrical operating power to the reader. The analog to digital converter measures the power level of the internal power source, which is declining as a function of use. The analog to digital converter additionally acquires the analog data from the detection signal and converts the analog data to converted digital data for use in the detection mode. The analog to digital converter also acquires the digital data from the transponder data signal for use in a signal reading mode of operation. The single-chip microcontroller preferably contains specific software and/or firmware to demodulate the transponder data signal and read the digital data from the transponder data signal in the signal reading mode of operation.

In accordance with a first embodiment, the transponder data signal is conditioned with the receiver electronics by reducing the voltage value of the transponder data signal and maintaining the transponder data signal in a voltage range between about ground and a power supply for the reader, inclusive. In accordance with a second embodiment, the transponder data signal is conditioned with the receiver electronics by rectifying the voltage value of the transponder data signal and maintaining the transponder data signal in a voltage range between about ground and a power supply for the reader, inclusive. In accordance with a third embodiment, the transponder data signal is conditioned with the receiver electronics by rectifying the voltage value of the transponder data signal and integrating the transponder data signal over one or more cycles of a carrier frequency of the transponder data signal.

The method may further include isolating points on the detection signal where the analog data is to be acquired from the detection signal with a sample and hold circuit having one or more sample times. The sample and hold circuit can also isolate points on the transponder data signal where the digital data is to be acquired. The sample and hold circuit is preferably included in the analog to digital converter of the single-chip microcontroller. The microcontroller controls the one or more sample times of the sample and hold circuit and adjusts the one or more sample times to enable transponder detection from a limited sampling of detection signals. The microcontroller also adjusts the one or more sample times in response to different values of carrier frequency, data rate, and/or modulation type of the transponder data signal.

The present invention will be further understood from the drawings and the following detailed description.

DESCRIPTION OF PREFERRED EMBODIMENTS

Figure 1:
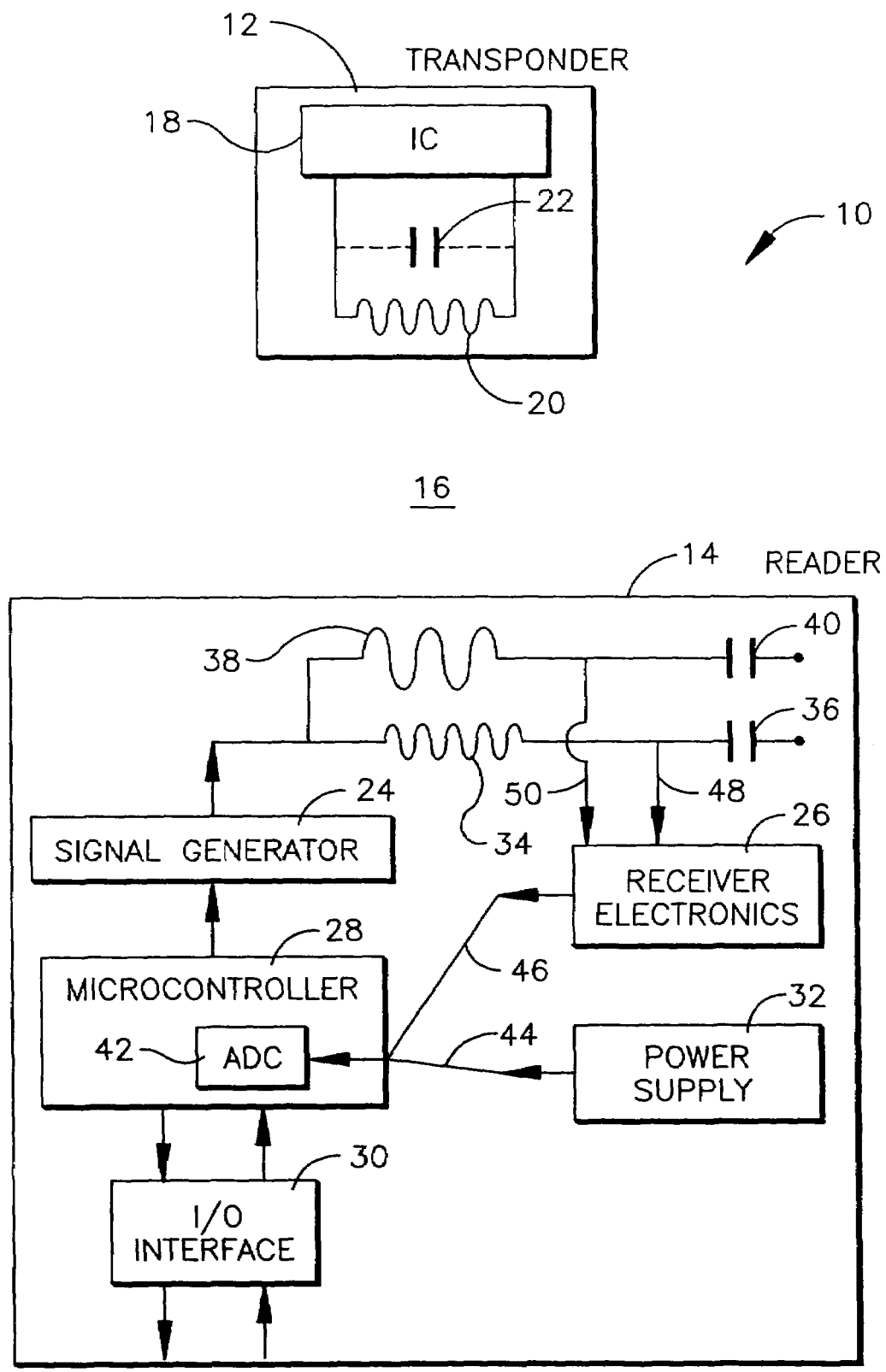
FIG. 1 is a block diagram of an RFID system employing the reader of the present invention.

Referring initially to FIG. 1, a conceptualized embodiment of an RFID system is shown and generally designated 10. The RFID system 10 comprises a transponder 12 and a reader 14. The reader 14 is a preferred embodiment of a reader of the present invention and is described in greater detail hereafter.

The embodiment of the transponder shown herein is a passive device. As such, the transponder 12 is not physically coupled with an electrical power supply. The electrical power required to operate the transponder 12 is indirectly supplied to the transponder 12 by electromagnetic waves, which are periodically propagated through open space 16 to the transponder 12 from the reader 14. The transponder 12 is only operational when it is receiving electromagnetic waves from the reader 14 of a specific frequency and of sufficient strength to power up the transponder 12.

The transponder 12 includes a transponder integrated circuit (IC) 18 and a transponder antenna 20 coupled with the transponder IC 18. The transponder antenna 20 is a single conventional coil which performs both the receiving and transmitting functions of the transponder 12. Thus, the transponder antenna 20 is termed a "dual-function antenna." However, the present invention is not limited to an RFID system having a transponder with a single dual-function transponder antenna. The present invention alternately encompasses an RFID system having a transponder with separate receiving and transmitting antennas, which separately perform the receiving and transmitting functions of the transponder.

The transponder IC 18 is preferably a custom IC which satisfies essentially all remaining required transponder functionalities, such as disclosed in the '188 and '574 patents. The transponder 12 may optionally include an external transponder tuning capacitor 22 coupled with the transponder IC 18 and transponder antenna 20. The term "external" is used herein to designate electronic components which are not physically or functionally included within an integrated circuit. The transponder antenna 20, in cooperation with the transponder tuning capacitor 22, if present, determines the carrier frequency of the transponder 12. In particular, the practitioner sets the carrier frequency of the transponder 12 by selecting an antenna and optionally a tuning capacitor for the transponder 12, which are tuned to either 125 kHz or 13.56 MHz.

The present transponder 12 is but one example of a type of transponder having utility in the RFID system 10. It is understood that the present invention is not limited to any one specific type of transponder, but is generally applicable to most conventional types of transponders having utility in RFID systems including the different transponder types shown and described in the '188, '574, and '263 patents. Thus, for example, the transponder 12 can be selected from proximity cards, proximity tags, smart cards, or the like. It is further understood that the RFID system 10 is not limited to RFID systems having only one transponder and one reader as shown. The present RFID system 10 is shown as such primarily for ease of description. In practice, RFID systems having utility in the present invention typically include any number of compatible transponders and can also include a plurality of compatible readers.

The reader 14 comprises a reader signal generator 24, reader receiver electronics 26, a reader microcontroller 28, a reader input/output (I/O) interface 30, and a reader power supply 32. The reader 14 further comprises a reader low frequency antenna 34 and correspondingly paired reader low frequency tuning capacitor 36 and a reader high frequency antenna 38 and correspondingly paired reader high frequency tuning capacitor 40.

The reader power supply 32 is preferably a finite electrical power source which is self-contained (i.e., internal) within the reader 14, such as a relatively small portable battery consisting of one or more disposable dry cells or rechargeable cells. It is noted that the reader 14 is alternatively operable with a power supply which is hard wired to an essentially infinite remote electrical power source, such as an electric utility.

The signal generator 24 includes conventional electronic components similar to those disclosed in the '188 patent and the '708 patent for generating relatively low energy electromagnetic waves termed "ring signals" or "detection signals" and for generating relatively high energy electromagnetic waves termed "excitation signals". The signal generator 24 preferably includes electronic components for generating low frequency detection and excitation signals having a frequency of 125 kHz and high frequency detection and excitation signals having a frequency of 13.56 MHz.

The signal generator 24 is coupled with the reader low frequency antenna and paired low frequency tuning capacitor 34, 36 to transmit low frequency detection and excitation signals from the signal generator 24 through the open space 16 for reception by any nearby transponders which are tuned to 125 kHz. The signal generator 24 is similarly coupled with the reader high frequency antenna and paired high frequency tuning capacitor 38, 40 to transmit high frequency detection and excitation signals from the signal generator 24 through the open space 16 for reception by any nearby transponders which are tuned to 13.56 MHz.

The excitation signals transmitted from the reader 14 typically have a limited range due to size and power constraints of the reader 14. Thus, the reader 14 and transponder 12 of the RFID system 10 are simultaneously operational only when the transponder 12 is within the range of the reader 14 and, more particularly, when the reader 14 and transponder 12 are positioned in relative proximity to one another such that the transponder 12 receives excitation signals of sufficient strength and an appropriate frequency from the reader 14 to power up the transponder 12.

In most conventional RFID systems, the position of the reader is stationary (i.e., constant) relative to the surrounding environment, while the position of the transponder is portable (i.e., variable) within the surrounding environment. In such cases, the user of the RFID system moves the portable transponder into relative proximity with the stationary reader to enable simultaneous operation of the both the transponder and reader. In some conventional RFID systems, however, the position of the reader may be portable relative to the surrounding environment, while the position of the transponder is either portable or stationary. In the case of a portable reader and a stationary transponder, the user moves the portable reader into relative proximity with the stationary transponder to enable simultaneous operation of the both the transponder and reader. In the case of a portable reader and a portable transponder, the user may move both the portable reader and the portable transponder into relative proximity with one another to enable simultaneous operation of the both the transponder and reader. The present invention is not limited to any one of the above-recited RFID system configurations.

The signal generator 24 initially operates in a transponder detection mode. The transponder detection mode is a reduced power state of operation which is effected by periodically drawing reduced electrical current from the reader power supply 32 under the direction of the reader microcontroller 28. The signal generator 24 periodically generates both 125 kHz and 13.56 MHz detection signals containing analog data in response to the reduced electrical current. The 125 KHz detection signals are periodically transmitted from the reader 14 on the reader low frequency antenna 34 and the 13.56 MHz detection signals are periodically transmitted from the reader 14 on the reader high frequency antenna 38. The detection signals are of insufficient strength to power operation of any transponders 12 residing in the surrounding open space 16, but nevertheless propagate into the open space 16 surrounding the reader 14. Propagated detection signals returned to the reader 14 via the reader low and/or high frequency antennas 34, 38 are monitored and evaluated by the reader 14 when operating in the transponder detection mode.

The monitoring and evaluating functionalities are integrated into the reader microcontroller 28, which is preferably a single-chip device. An exemplary single-chip microcontroller having utility herein is Model MSP430 available from Texas Instruments, Inc., 12500 TI Boulevard, Dallas, Tex. 75243-4136. The reader microcontroller 28 also contains an analog to digital converter (ADC) module 42, which preferably includes a conventional sample and hold circuit (not shown). The ADC module 42 has a first ADC input 44 and a second ADC input 46. The first ADC input 44 couples the ADC module 42 with the reader power supply 32. The second ADC input 46 couples the ADC module 42 with the reader receiver electronics 26. The reader receiver electronics 26 are in turn coupled with the reader low frequency antenna and paired low frequency tuning capacitor 34, 36 and with the reader high frequency antenna and paired high frequency tuning capacitor 38, 40 via first and second receiver electronics inputs 48 and 50, respectively.

The transponder detection mode functionalities are enabled at least in part by the ADC module 42 and specific software and/or firmware included in the reader microcontroller 28. In particular, the ADC module 42 is used to convert the analog data of the detection signals to digital data. The firmware included in the reader microcontroller 28 is then used to identify changes in degree and/or changes in kind within the digital data. The firmware further recognizes which changes in the digital data correspond to changes in one or more selected detection parameters, such as the decay rate or voltage of the detection signals. Changes in one or more of the selected detection parameters indicates the presence of a transponder 12 having a given frequency in the open space 16. It is noted that the firmware of the reader microcontroller 28 preferably does not utilize the relation between analog values of a single detection parameter embodied in the detection signals and a fixed threshold value of the detection parameter as the criteria for determining the presence of a transponder. Instead, the firmware, in cooperation with the ADC module 42 of the reader microcontroller 28, preferably utilizes data trends over time in the digital data extracted from the detection signals, which can correlate to one or more detection parameters, to more efficiently determine the presence of a transponder. Thus, the firmware monitors digital data changes with reference to the preceding digital data to detect a transponder rather than with reference to a fixed threshold value of a detection parameter.

When the reader microcontroller 28 detects a transponder 12 in the above-recited manner, the reader microcontroller 28 switches the signal generator 24 from the transponder detection mode at the reduced power state to a transponder excitation mode at an increased power state of operation. Switching the signal generator 24 to the excitation mode terminates periodic generation of the detection signals of the given frequency and causes the signal generator 24 to draw increased electrical current from the reader power supply 32. The increased draw of electrical current in the excitation mode enables the signal generator 24 to generate an excitation signal of the given frequency under the direction of the reader microcontroller 28. The excitation signal is in the form of an electromagnetic wave, which has sufficient strength to power up the transponder 12.

The transponder antenna 20 has an excitation signal reception range which is generally about 4 to 5 inches when the reader and transponder antennas are coaxially aligned. When the transponder 12 and/or reader 14 is moved to a proximal position such that the distance between reader 14 and transponder 12 is within the excitation signal reception range of the transponder antenna 20, the transponder antenna 20 receives the excitation signal at a sufficient strength to power up the transponder IC 18, thereby activating the transponder 12.

Upon activation, the transponder IC 18 generates a communication signal termed a transponder data signal, which contains readable information (i.e., digital data) copied or otherwise derived from the memory of the transponder IC 18. The transponder data signal is in the form of an electromagnetic wave like the excitation signal. It is noted that communication signals of RFID systems (i.e., excitation and transponder data signals) are typically termed radio frequency signals. However, the excitation and transponder data signals of the present invention are not limited exclusively to signals having specific frequencies within the narrow "radio frequency" range, as "radio frequency" is commonly defined for the radio communication industry. The transponder 12 transmits the transponder data signal into the open space 16 of the external environment via the transponder antenna 20.

Each of the reader antennas 34, 38 shown is a conventional coil acting as a single dual-function antenna, which performs both the receiving and transmitting functions of the reader 14. In particular, the reader antennas 34, 38 receive the low and high frequency detection signals and the low and high frequency transponder data signals, respectively, from the open space 16 and transmit the low and high frequency detection and excitation signals into the open space 16. However, the present invention is not limited to an RFID system having a reader with dual-function antennas. The present invention alternately encompasses an RFID system having a reader with separate receiving and transmitting antennas, which separately perform the transponder data signal and detection signal receiving functions of the reader and the detection signal and excitation signal transmitting functions of the reader, respectively. In yet another alternative, where a reader is provided with separate receiving and transmitting antennas, the reader transmitting antennas are capable of being adapted to act as dual-function antennas (i.e., receiving and transmitting) only with respect to the detection signals while the reader transmitting and receiving antennas function separately with respect to the transponder data signals.

Transponder data signal reading components and their corresponding functionality are integrated into the reader microcontroller 28 along with the transponder detection components and the components for activating the excitation mode and their corresponding functionalities described above. The transponder data signal reading functionalities are enabled in part by specific firmware included in the reader microcontroller 28. The receiver electronics receive the low and high frequency transponder data signals for any of a plurality of data rates and modulation types, from the reader antennas 34, 38, via the first and second receiver electronics inputs 48, 50, respectively. The reader receiver electronics 26 "condition" the low and high frequency transponder data signals and thereafter convey them to the ADC module 42 via the second ADC input 46.

The reader microcontroller 28 demodulates the conditioned transponder data signals in accordance with the respective modulation type of the signal to read the data on the signals. The demodulator which performs the demodulation step within the reader microcontroller 28 is preferably based in the firmware and/or software of the reader microcontroller 28 rather than being hardware-based. The resulting data can then be sent to an external device (not shown), such as a central host computer, via the reader I/O interface 30.

The signal conditioning function of the reader receiver electronics 26 places the signals containing analog and digital data of differing carrier frequencies, data rates and modulation types as recited above into a form which enables the integrated reader microcontroller 28 to properly process the entire range of signals. Specific embodiments of the reader receiver electronics 26 are shown and described hereafter with reference to FIGS. 2–4, which perform the signal conditioning function.

Figure 2:
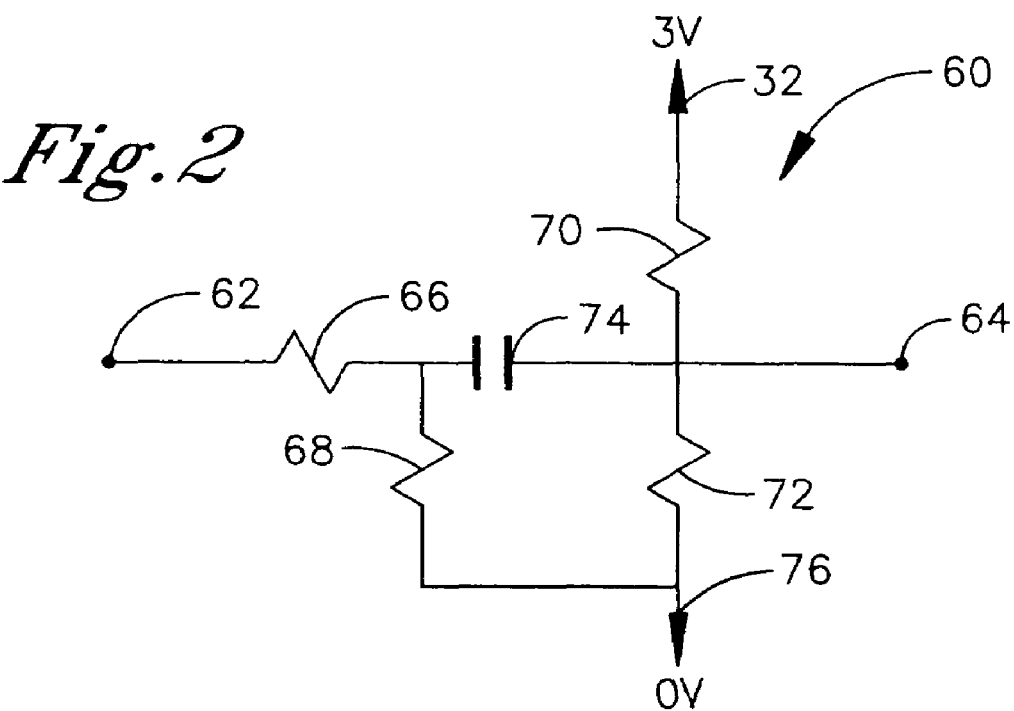
FIG. 2 is a schematic view of a first conditioning circuit having utility in the receiver electronics of the reader of FIG. 1.

Referring initially to FIG. 2, a first conditioning circuit termed a resistor divider section is shown and generally designated 60. The first conditioning circuit 60 has an input node 62 which is coupled with the reader low frequency antenna and paired low frequency tuning capacitor 34, 36 via the first receiver electronics input 48 or with the reader high frequency antenna and paired high frequency tuning capacitor 38, 40 via the second receiver electronics input 50 for receiving transponder data signals. The first conditioning circuit 60 also has an output node 64, which is coupled directly with the second ADC input 46 for conveying transponder data signals from the first conditioning circuit 60 to the sample and hold circuit of the ADC module 42, if the sample and hold circuit of the ADC module 42 is fast enough to capture the peak of a 125 kHz or 13.56 MHz transponder data signal. If the sample and hold circuit of the ADC module 42 is not sufficiently fast, an additional sample and hold circuit (not shown) of sufficient speed is provided in series between the output node 64 and the ADC module 42.

The first conditioning circuit 60 contains first and second series resistors 66, 68, third and fourth series resistors 70, 72, and a blocking capacitor 74. The first and second series resistors 66, 68 in combination form a voltage divider which reduces the high voltage of the transponder data signal on the low or high frequency antenna and paired tuning capacitor 34, 36 or 38, 40 to a lower voltage level, which can be input to the ADC module 42 of the reader microcontroller 28. The third and fourth series resistors 70, 72 are positioned in series between ground 76 (0 volts) and the reader power supply 32, which is, for example, 3 volts. The third and fourth series resistors 70, 72 in combination with the blocking capacitor 74, which is in parallel with the second series resistor 68, function to maintain the voltage of the transponder data signal input to the ADC module 42 in a voltage range between ground (i.e., 0 volts in the present example) and the voltage of the reader power supply 32 (i.e., 3 volts in the present example), inclusive.

In a preferred embodiment, a separate first conditioning circuit 60 is provided for each reader receiving antenna and paired tuning capacitor, which are coupled with the first conditioning circuit 60. Since the first conditioning circuit 60 contains only four resistors and one capacitor, while avoiding use of a multi-stage band pass amplifier, the first conditioning circuit 60 is a simple yet effective means for conditioning the transponder data signal. In many cases, the resulting transponder data signal has an acceptable voltage for inputting to the ADC module 42 of the reader microcontroller 28 and for processing by the reader microcontroller 28 in the manner recited herein.

Figure 3:
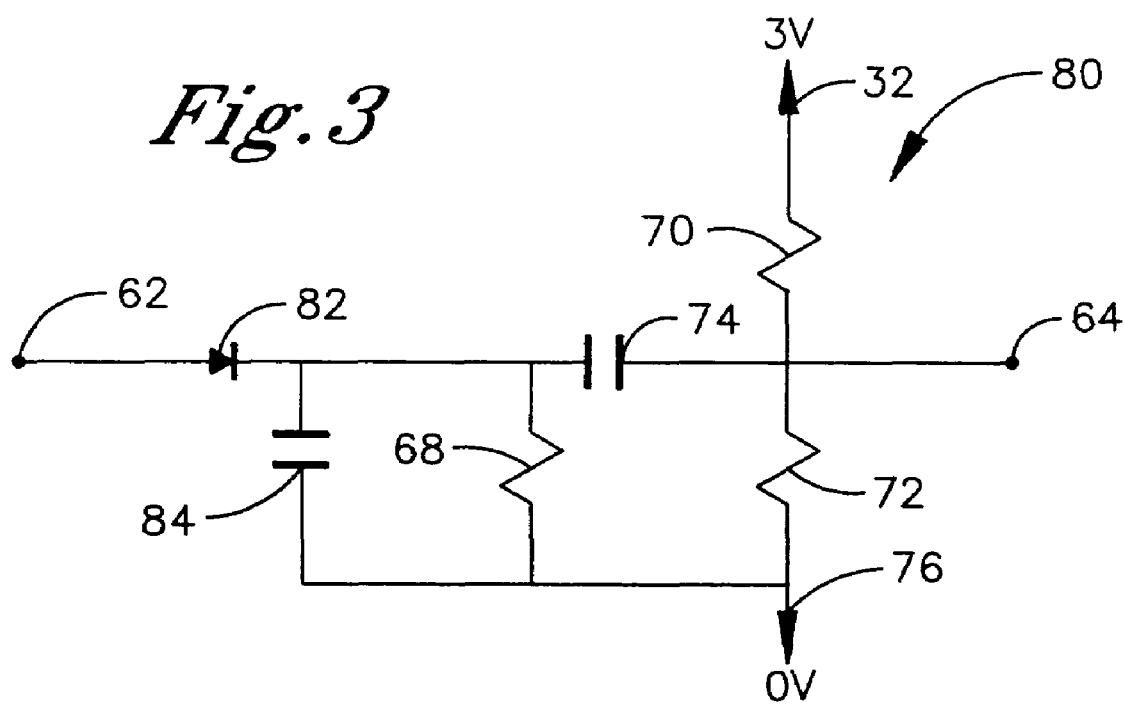
FIG. 3 is a schematic view of a second conditioning circuit having utility in the receiver electronics of the reader of FIG. 1.

As stated above, the first conditioning circuit 60 is effective for its intended purpose. However, in some cases the voltage reduction of the transponder data signal by the voltage divider can be disadvantageous. Referring to FIG. 3, a second conditioning circuit is shown and generally designated 80, which is an alternate embodiment or a supplemental embodiment of the reader receiver electronics 26 relative to the above-recited embodiment of the reader receiving electronics designated as the first conditioning circuit 60. The second conditioning circuit 80 avoids voltage reduction of the transponder data signal.

Components which are common to both the first and second conditioning circuits 60, 80 are designated in FIGS. 2 and 3 by the same reference characters. The second conditioning circuit 80, termed a peak detector section, differs from the first conditioning circuit 60 by only a few components. In particular, the first series resistor 66 of the first conditioning circuit 60 is replaced in the second conditioning circuit 80 with a diode 82 and a second capacitor 84 in parallel with the second series resistor 68. In all other respects, the first and second conditioning circuits 60, 80 are identical. The diode 82 rectifies the voltage of the transponder data signal obtained from the low or high frequency antenna and paired tuning capacitor 34, 36 or 38, 40 and functions in combination with the second capacitor 84 as a peak voltage detector for the transponder data signal. Although only a single diode 82 is shown in the present embodiment of the second conditioning circuit 80, it is understood that in practice the second conditioning circuit 80 can employ multiple diodes for the rectifying and peak voltage detection functions.

In a preferred embodiment, a separate second conditioning circuit 80 is provided for each reader receiving antenna and paired tuning capacitor, which are coupled with the second conditioning circuit 80. Like the first conditioning circuit 60, the second conditioning circuit 80 avoids use of a multi-stage band pass amplifier, while providing a simple yet effective means for conditioning the transponder data signal. In many cases, the resulting transponder data signal is acceptable for inputting to the ADC module 42 of the reader microcontroller 28 and for processing by the reader microcontroller 28 in the manner recited herein.

Figure 4:
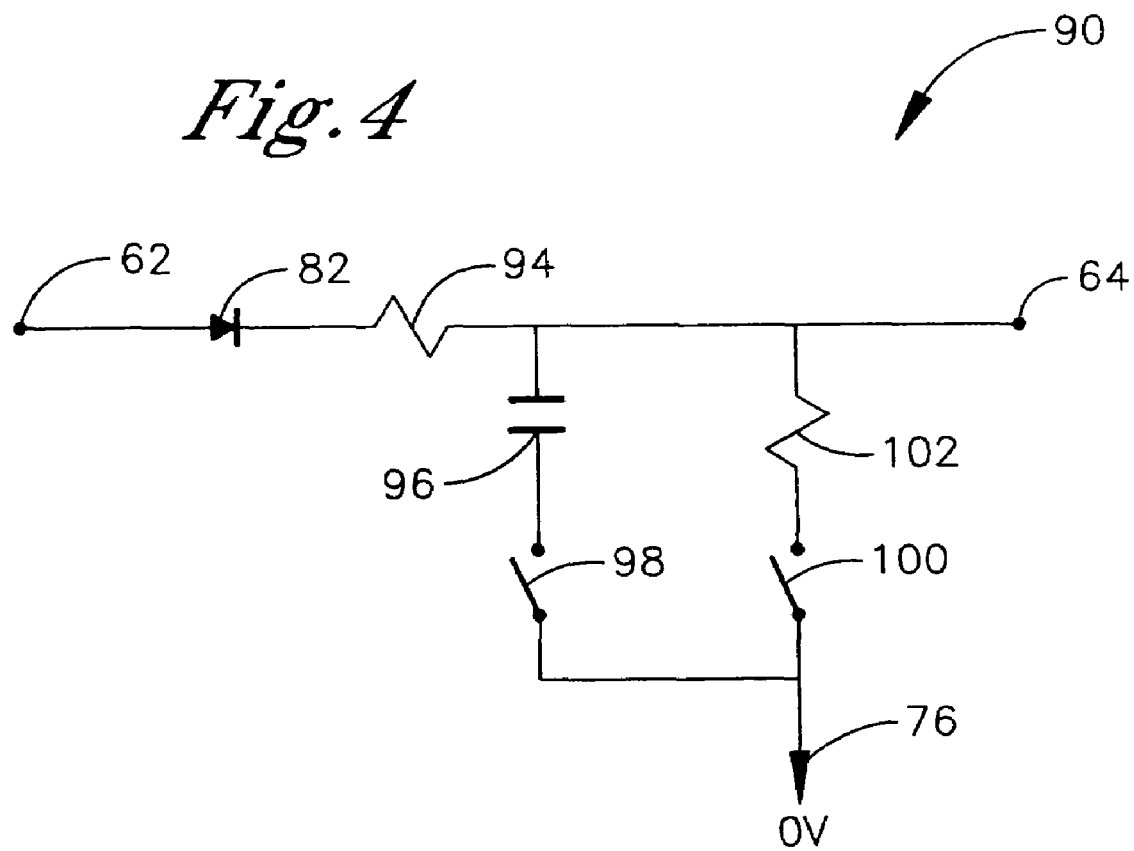
FIG. 4 is a schematic view of a third conditioning circuit having utility in the receiver electronics of the reader of FIG. 1.

In some cases, the reader microcontroller 28 is relatively slow running, i.e., is not fast enough to keep pace with a high frequency transponder data signal. Referring to FIG. 4, a third conditioning circuit is shown and generally designated 90, which provides a solution to this problem. The third conditioning circuit 90 is termed an integrator section because the third conditioning circuit 90 integrates the transponder data signal over one or more cycles of the carrier frequency before inputting the resulting integrated transponder data signal to the ADC module 42 of the reader microcontroller 28.

Components which are common to the first, second and third conditioning circuits 60, 80, 90 are designated in FIGS. 2–4 by the same reference characters. As such, the third conditioning circuit 90 has an input node 62 which is coupled with the reader low frequency antenna and paired low frequency tuning capacitor 34, 36 via the first receiver electronics input 48 or with the reader high frequency antenna and paired high frequency tuning capacitor 38, 40 via the second receiver electronics input 50 for receiving transponder data signals. The third conditioning circuit 90 further comprises in series a diode 82 and an integrator resistor 94 downstream of the input node 62. An integrator capacitor 96, a charging switch 98, a grounding switch 100, and a grounding switch resistor 102 are provided downstream of the integrator resistor 94. The integrator capacitor 96 and charging switch 98 are in series with one another and the grounding switch 100 and grounding switch resistor 102 are in series with one another, respectively. However, the series paired integrator capacitor and charging switch 96, 98 are in parallel with the series paired grounding switch and grounding switch resistor 100, 102. Both the charging switch 98 and grounding switch 100 are preferably electronic switches.

The charging switch 98 couples the integrator capacitor 96 with the input node 62 when the charging switch 98 is closed and decouples the integrator capacitor 96 from the input node 62 when the charging switch 98 is open. The grounding switch 100 couples the integrator capacitor 96 with ground 76 when the grounding switch 100 is closed and couples the integrator capacitor 96 with the output node 64 when the grounding switch 100 is open. As recited above, the output node 64 is coupled directly with the second ADC input 46 for conveying integrated transponder data signals from the integrator capacitor 96 to the ADC module 42.

The diode 82 rectifies the voltage of the transponder data signal obtained from the reader low or high frequency antenna and paired tuning capacitor 34, 36 or 38, 40. Although only a single diode 82 is shown in the present embodiment of the third conditioning circuit 90, it is understood that in practice the third conditioning circuit 90 can employ multiple diodes for the rectifying function. The integrator resistor 94 and integrator capacitor 96 in combination form an integrator which integrates the transponder data signal over one or more cycles of the carrier frequency. After the sample and hold circuit of the ADC module 42 has sampled and held a voltage on the integrator capacitor 96, the grounding switch 100 is closed to remove the charge from the integrator capacitor 96 through the relatively small grounding switch resistor 102 and initialize the integrator 94, 96. The grounding switch 100 is then opened for the next integration and the cycle is repeated.

The charging switch 98 controls over which cycles of the carrier frequency the integration is performed. The integrator capacitor 96 can only be charged when the charging switch 98 is closed. Accordingly, the charging switch 98 is closed for cycles of the carrier frequency over which it is desired to perform the integration and is opened for cycles of the carrier frequency over which it is not desired to perform the integration. Although not shown, it is within the scope of the present invention to alternatively position the charging switch 98 between the input node 62 and the diode 82, between the diode 82 and the integrator resistor 94, or between the integrator resistor 94 and the integrator capacitor 96. Any of these alternate positions of the charging switch 98 will not modify its function as recited above.

In a preferred embodiment, a separate third conditioning circuit 90 is provided for each reader receiving antenna and paired tuning capacitor, which are coupled with the third conditioning circuit 90. Like the first and second conditioning circuits 60, 80, the third conditioning circuit 90 avoids use of a multi-stage band pass amplifier, while providing a simple yet effective means for conditioning the transponder data signal. In many cases the resulting transponder data signal is acceptable for inputting to the ADC module 42 of the reader microcontroller 28 and for processing by the reader microcontroller 28 in the manner recited herein.

All three types of conditioning circuits, i.e., the first, second and third conditioning circuits 60, 80, 90, can be utilized together in combination as the reader receiver electronics 26. Alternatively, any two types of the conditioning circuits can be utilized in combination as the reader receiver electronics 26 while excluding the remaining type of conditioning circuit from the reader receiver electronics 26. In yet another alternative, only one type of conditioning circuit can be utilized as the reader receiver electronics 26 while excluding the remaining two types of conditioning circuits from the reader receiver electronics 26. Selection of the specific conditioning circuits recited herein for use in the reader receiver electronics 26 is within the purview of the skilled artisan, being a function of the particular requirements of the reader microcontroller 28 and the character of the signals received by the reader antennas 34, 38.

Use of one or more of the above-recited conditioning circuits 60, 80, 90 in combination with the integrated reader microcontroller 28 as recited herein enables the reader 14 to effectively acquire and process analog data from detection signals having a plurality of different frequency characteristics during a transponder detection mode of operation, while simultaneously effectively acquiring and processing digital data from transponder data signals having a plurality of different carrier frequency, data rate and modulation characteristics during a signal reading mode of operation.

In accordance with the transponder detection mode, nearby transponders are detected when specified digital data extracted from the detection signals, which are transmitted from the reader antennas 34, 38, changes, as measured by the ADC module 42 at a set sampling time or times. The transponder detection mode is optimized by careful selection or adjustment of the sampling time or times of the ADC module 42 of the reader microcontroller 28 to enable transponder detection from only a limited sampling of detection signals.

The signal reading mode is also optimized by careful selection or adjustment of the sampling time or times of the ADC module 42 of the reader microcontroller 28 in accordance with the carrier frequencies, data rates, and modulation types. Efficient microcontroller firmware instructions are then used to locate bit transitions in the data of the ADC module 42 and recover the bits transmitted to the reader 14 from the transponder 12. A specific sequence of bits stored in a specific location in the transponder 12 is received by the reader 14 and used to assist in synchronization of the reader microcontroller 28 with bit transitions from the transponder 12. For example, a specific bit sequence transmitted by the transponder 12 to the reader 14 is the sequence 00110101, wherein the leftmost bit is transmitted first by the transponder 12.

As noted, all of the above-recited conditioning circuits advantageously contain only simple and low-cost electronic components such as diodes, resistors, capacitors, electronic switches and the like. Use of the specific reader receiver electronics 26 disclosed herein in combination with the ADC module 42 of the reader microcontroller 28 and its associated firmware enables the practitioner to preferably avoid the inclusion of costly and complex multi-stage band pass amplifiers in the reader design or at least reduce the number of stages in the band pass amplifiers, if a band pass amplifier is retained.

The conditioning circuits and integrated reader microcontroller recited herein further enable the above-recited reader operations while efficiently conserving reader power. Reduced power consumption is effected by reducing the number of electronic components in the reader design and by directing the powering off of certain reader modules or components during periods of non-use. An efficient instruction set from the reader microcontroller 28 can also reduce power consumption by minimizing the oscillator frequency used to process data in real time.

Another functional feature of the reader 14 is the capability of monitoring the status of the reader power supply 32 simultaneous with the data acquisition and processing functions so that the user can estimate the time of reliable reader operation remaining before it is necessary to replace or recharge the power supply 32. This feature is enabled by the ADC module 42 of the reader microcontroller 28, which periodically measures the voltage of the reader power supply 32. The measured voltage value or a status message is subsequently communicated to the user or to an external device via the reader I/0 interface 30.

While the forgoing preferred embodiments of the invention have been described and shown, it is understood that alternatives and modifications, such as those suggested and others, may be made thereto and fall within the scope of the invention.

I claim:

1. A reader for an RFID system comprising:
    a signal generator for generating a detection signal containing analog data and for generating an excitation signal;
    a transmitting antenna coupled with said signal generator for transmitting said detection signal and said excitation signal into a space surrounding said transmitting antenna;
    a receiving antenna for receiving a transponder data signal at a voltage value containing received digital data from a transponder in said space;
    receiver electronics coupled with said receiving antenna for conditioning said transponder data signal to a conditioned transponder data signal including said received digital data;
    an internal power source for supplying electrical operating power to said reader, said internal power source having a declining power level as a function of use; and
    a single-chip microcontroller coupled with said internal power source and said receiver electronics, said single-chip microcontroller including an analog to digital converter to acquire said analog data from said detection signal and said received digital data from said conditioned transponder data signal and to convert said analog data from said detection signal to converted digital data, wherein said microcontroller further includes a detection means for evaluating said converted digital data to detect a transponder presence in the space surrounding said transmitting antenna and said microcontroller further includes a reading means for demodulating said conditioned transponder data signal to read said received digital data.

2. The reader of claim 1, wherein said receiver electronics includes a receiver electronics input from said receiving antenna, a receiver electronics output to said single-chip microcontroller, and a plurality of relatively low-cost simple electrical components selected from the group consisting of resistors, diodes, capacitors, and electrical switches, and excludes relatively high-cost complex multi-stage band pass amplifiers.

3. The reader of claim 1, wherein said reading means is a software and/or firmware-based demodulator.

4. The reader of claim 1, wherein said receiving antenna and said transmitting antenna are both included in a single dual-function antenna.

5. The reader of claim 1, wherein said reader further comprises a sample and hold circuit having one or more sample times for isolating points on said detection signal where said analog data is to be acquired and for isolating points on said transponder data signal where said received digital data is to be acquired.

6. The reader of claim 5, wherein said sample and hold circuit is included in said analog to digital converter of said single-chip microcontroller.

7. The reader of claim 5, wherein said microcontroller controls said one or more sample times of said sample and hold circuit and adjusts said one or more sample times in response to different values of carrier frequency, data rate, and/or modulation type of said transponder data signal.

8. The reader of claim 5, wherein said microcontroller controls said one or more sample times of said sample and hold circuit and adjusts said one or more sample times to enable detection of a transponder from a limited sampling of detection signals.

9. The reader of claim 1 further comprising a transmitting tuning capacitor paired with said transmitting antenna and a receiving tuning capacitor paired with said receiving antenna.

10. The reader of claim 9, wherein said receiving tuning capacitor and said transmitting tuning capacitor are both included in a single dual-function tuning capacitor.

11. The reader of claim 9, wherein said transmitting tuning capacitor and/or said receiving tuning capacitor is a first tuning capacitor for tuning a first reader antenna to a higher carrier frequency, said reader further comprising a second tuning capacitor for tuning a second reader antenna to a lower carrier frequency.

12. A reader for an RFID system comprising:
a signal generator for generating a detection signal containing analog data and for generating an excitation signal;
a transmitting antenna coupled with said signal generator for transmitting said detection signal and said excitation signal into a space surrounding said transmitting antenna;
a receiving antenna for receiving a transponder data signal at a voltage value containing digital data from a transponder in said space;
receiver electronics coupled with said receiving antenna for conditioning said transponder data signal to place said transponder data signal in a condition for reading said digital data;
an internal power source for supplying electrical operating power to said reader, said internal power source having a declining power level as a function of use; and
a single-chip microcontroller coupled with said internal power source and said receiver electronics, said single-chip microcontroller including an analog to digital converter to acquire said analog data from said detection signal and said digital data from said transponder data signal and to convert said analog data from said detection signal to converted digital data, wherein said receiver electronics includes a resistor divider section comprising first and second series resistors at said receiver electronics input forming a voltage divider to reduce said voltage value of said transponder data signal and third and fourth series resistors downstream of said first and second series resistors positioned between ground and said power supply and a blocking capacitor positioned in parallel with the second series resistor upstream of said third and fourth series resistors to maintain said transponder data signal at said receiver electronics output in a voltage range between about ground and said power supply, inclusive.

13. The reader of claim 12, wherein said receiver electronics further includes a peak detector section comprising a rectifier at said receiver electronics input to rectify said voltage value of said transponder data signal and a pair of series resistors downstream of said rectifier positioned between ground and said power supply and a blocking capacitor positioned between said rectifier and said pair of series resistors to maintain said transponder data signal at said receiver electronics output in a voltage range between about ground and said power supply, inclusive.

14. The reader of claim 13, wherein said rectifier includes a diode and said peak detector section further comprises a detector capacitor and a detector resistor, said detector capacitor and detector resister positioned in parallel with one another and in parallel with said blocking capacitor downstream of said diode and upstream of said pair of series resistors.

15. The reader of claim 13, wherein said receiver electronics further includes an integrator section comprising an integrator at said receiver electronics input and coupled with said receiver electronics output, said receiver electronics output coupled with said analog to digital converter.

16. The reader of claim 12, wherein said receiver electronics further includes an integrator section comprising a rectifier and an integrator in series at said receiver electronics input and coupled with said receiver electronics output, said receiver electronics output coupled with said analog to digital converter.

17. The reader of claim 16, wherein said rectifier includes a diode and said integrator includes an integrator resistor and integrator capacitor in series with said diode, said integrator section further comprising a paired grounding switch resistor and grounding switch in series with one another and in parallel with said integrator capacitor downstream of said integrator resistor, said paired grounding switch resistor and grounding switch coupling said integrator capacitor with ground when said grounding switch is closed and coupling said integrator capacitor with said analog to digital converter when said grounding switch is open.

18. The reader of claim 16, wherein said rectifier includes a diode and said integrator includes an integrator resistor and integrator capacitor in series with said diode, said integrator section further comprising a charging switch in series with said integrator capacitor and ground, said charging switch coupling said integrator capacitor with said receiving antenna when said charging switch is closed and decoupling said integrator capacitor from said receiving antenna when said charging switch is open.

19. A reader for an RFID system comprising:
a signal generator for generating a detection signal containing analog data and for generating an excitation signal;
a transmitting antenna coupled with said signal generator for transmitting said detection signal and said excitation signal into a space surrounding said transmitting antenna;
a receiving antenna for receiving a transponder data signal at a voltage value containing digital data from a transponder in said space;

receiver electronics coupled with said receiving antenna for conditioning said transponder data signal to place said transponder data signal in a condition for reading said digital data;

an internal power source for supplying electrical operating power to said reader, said internal power source having a declining power level as a function of use; and a single-chip microcontroller coupled with said internal power source and said receiver electronics, said single-chip microcontroller including an analog to digital converter to acquire said analog data from said detection signal and said digital data from said transponder data signal and to convert said analog data from said detection signal to converted digital data, wherein said receiver electronics includes a peak detector section comprising a rectifier at said receiver electronics input to rectify said voltage value of said transponder data signal and a pair of series resistors downstream of said rectifier positioned between ground and said power supply and a blocking capacitor positioned between said rectifier and said pair of series resistors to maintain said transponder data signal at said receiver electronics output in a voltage range between about ground and said power supply, inclusive.

20. The reader of claim 19, wherein said rectifier includes a diode and said peak detector section further comprises a detector capacitor and a detector resistor, said detector capacitor and detector resister positioned in parallel with one another and in parallel with said blocking capacitor downstream of said diode and upstream of said pair of series resistors.

21. The reader of claim 19, wherein said receiver electronics further includes an integrator section comprising an integrator at said receiver electronics input and coupled with said receiver electronics output, said receiver electronics output coupled with said analog to digital converter.

22. A reader for an RFID system comprising:

a signal generator for generating a detection signal containing analog data and for generating an excitation signal;

a transmitting antenna coupled with said signal generator for transmitting said detection signal and said excitation signal into a space surrounding said transmitting antenna;

a receiving antenna for receiving a transponder data signal at a voltage value containing digital data from a transponder in said space;

receiver electronics coupled with said receiving antenna for conditioning said transponder data signal to place said transponder data signal in a condition for reading said digital data;

an internal power source for supplying electrical operating power to said reader, said internal power source having a declining power level as a function of use; and a single-chip microcontroller coupled with said internal power source and said receiver electronics, said single-chip microcontroller including an analog to digital converter to acquire said analog data from said detection signal and said digital data from said transponder data signal and to convert said analog data from said detection signal to converted digital data, wherein said receiver electronics includes an integrator section comprising a rectifier and an integrator in series at said receiver electronics input and coupled with said receiver electronics output, said receiver electronics output coupled with said analog to digital converter.

23. The reader of claim 22, wherein said rectifier includes a diode and said integrator includes an integrator resistor and integrator capacitor in series with said diode, said integrator section further comprising a paired grounding switch resistor and grounding switch in series with one another and in parallel with said integrator capacitor downstream of said integrator resistor, said paired grounding switch resistor and grounding switch coupling said integrator capacitor with ground when said grounding switch is closed and coupling said integrator capacitor with said analog to digital converter when said grounding switch is open.

24. The reader of claim 22, wherein said rectifier includes a diode and said integrator includes an integrator resistor and integrator capacitor in series with said diode, said integrator section further comprising a charging switch in series with said integrator capacitor and ground, said charging switch coupling said integrator capacitor with said receiving antenna when said charging switch is closed and decoupling said integrator capacitor from said receiving antenna when said charging switch is open.

25. A reader for an RFID system comprising:

a signal generator for generating a detection signal containing analog data and for generating an excitation signal;

a transmitting antenna coupled with said signal generator for transmitting said detection signal and said excitation signal into a space surrounding said transmitting antenna;

a receiving antenna for receiving a transponder data signal at a voltage value containing received digital data from a transponder in said space;

receiver electronics coupled with said receiving antenna for conditioning said transponder data signal to a conditioned transponder data signal including said received digital data; and a single-chip microcontroller coupled with said receiver electronics, said single-chip microcontroller including an analog to digital converter to acquire said analog data from said detection signal and said received digital data from said transponder data signal and to convert said analog data from said detection signal to converted digital data, said single-chip microcontroller further including a demodulator for demodulating said conditioned transponder data signal to read said received digital data and still further including a detection means for evaluating said converted digital data to detect a transponder presence in the space surrounding said transmitting antenna.

26. The reader of claim 25, wherein said receiver electronics includes a receiver electronics input from said receiving antenna, a receiver electronics output to said single-chip microcontroller, and a plurality of relatively low-cost simple electrical components selected from the group consisting of resistors, diodes, capacitors, and electrical switches, and excludes one or more relatively high-cost complex multi-stage band pass amplifiers.

27. The reader of claim 25, wherein said receiving antenna and said transmitting antenna are both included in a single dual-function antenna.

28. A method for operating a reader for an RFID system comprising:

generating a detection signal containing analog data;

transmitting said detection signal from a transmitting antenna into a space surrounding said transmitting antenna;

acquiring said analog data from said detection signal with an analog to digital converter included within a single-chip microcontroller and coupled with receiver electronics;

converting said analog data to converted digital data with said analog to digital converter;

evaluating said converted digital data with said microcontroller to detect a proximal transponder in said space surrounding said transmitting antenna;

generating an excitation signal;

transmitting said excitation signal from said transmitting antenna into said space to power up said proximal transponder;

generating a transponder data signal at said proximal transponder in response to said excitation signal and propagating said transponder data signal through said space from said proximal transponder;

receiving said transponder data signal with a receiving antenna, wherein said transponder data signal is at a voltage value and contains received digital data;

conditioning said transponder data signal with said receiver electronics to a conditioned transponder data signal;

acquiring said received digital data from said conditioned transponder data signal with said analog to digital converter; and demodulating said conditioned transponder data signal with said microcontroller to read said received digital data.

29. The method of claim 28, wherein said receiver electronics includes a plurality of relatively low-cost simple electrical components selected from the group consisting of resistors, diodes, capacitors, and electrical switches, and excludes one or more relatively high-cost complex multi-stage band pass amplifiers.

30. The method of claim 28, wherein said conditioned transponder data signal is demodulated with software and/or firmware contained in said single-chip microcontroller.

31. The method of claim 28, wherein said receiving antenna and said transmitting antenna are both included in a single dual-function antenna.

32. The method of claim 28, wherein said transponder data signal is conditioned with said receiver electronics by reducing said voltage value of said transponder data signal and maintaining said transponder data signal in a voltage range between about ground and a power supply for said reader, inclusive.

33. The method of claim 32, wherein said transponder data signal is conditioned with said receiver electronics by rectifying said voltage value of said transponder data signal and maintaining said transponder data signal in a voltage range between about ground and a power supply for said reader, inclusive.

34. The method of claim 33, wherein said transponder data signal is conditioned with said receiver electronics by rectifying said voltage value of said transponder data signal and integrating said transponder data signal over one or more cycles of a carrier frequency of said transponder data signal.

35. The method of claim 32, wherein said transponder data signal is conditioned with said receiver electronics by rectifying said voltage value of said transponder data signal and integrating said transponder data signal over one or more cycles of a carrier frequency of said transponder data signal.

36. The method of claim 28, wherein said transponder data signal is conditioned with said receiver electronics by rectifying said voltage value of said transponder data signal and maintaining said transponder data signal in a voltage range between about ground and a power supply for said reader, inclusive.

37. The method of claim 28, wherein said transponder data signal is conditioned with said receiver electronics by rectifying said voltage value of said transponder data signal and integrating said transponder data signal over one or more cycles of a carrier frequency of said transponder data signal.

38. The method of claim 28, further comprising isolating points on said detection signal where said analog data is to be acquired with a sample and hold circuit having one or more sample times.

39. The method of claim 38, wherein said sample and hold circuit is included in said analog to digital converter of said single-chip microcontroller.

40. The method of claim 38, wherein said microcontroller controls said one or more sample times of said sample and hold circuit and adjusts said one or more sample times to enable detection of said proximal transponder from a limited sampling of detection signals.

41. The method of claim 28, further comprising isolating points on said transponder data signal where said received digital data is to be acquired with a sample and hold circuit having one or more sample times.

42. The method of claim 41, wherein said microcontroller controls said one or more sample times of said sample and hold circuit and adjusts said one or more sample times in response to different values of carrier frequency, data rate, and/or modulation type of said transponder data signal.

43. The method of claim 41, wherein said sample and hold circuit is included in said analog to digital converter of said single-chip microcontroller.

* * * * *